M. A. KETTLER.
FLUID SPEED CHANGING GEAR.
APPLICATION FILED DEC. 15, 1914.

1,199,904.

Patented Oct. 3, 1916.
3 SHEETS—SHEET 1.

Witnesses

Inventor
Milton A. Kettler, by
Attorney

M. A. KETTLER.
FLUID SPEED CHANGING GEAR.
APPLICATION FILED DEC. 15, 1914.
1,199,904.
Patented Oct. 3, 1916.
3 SHEETS—SHEET 2.
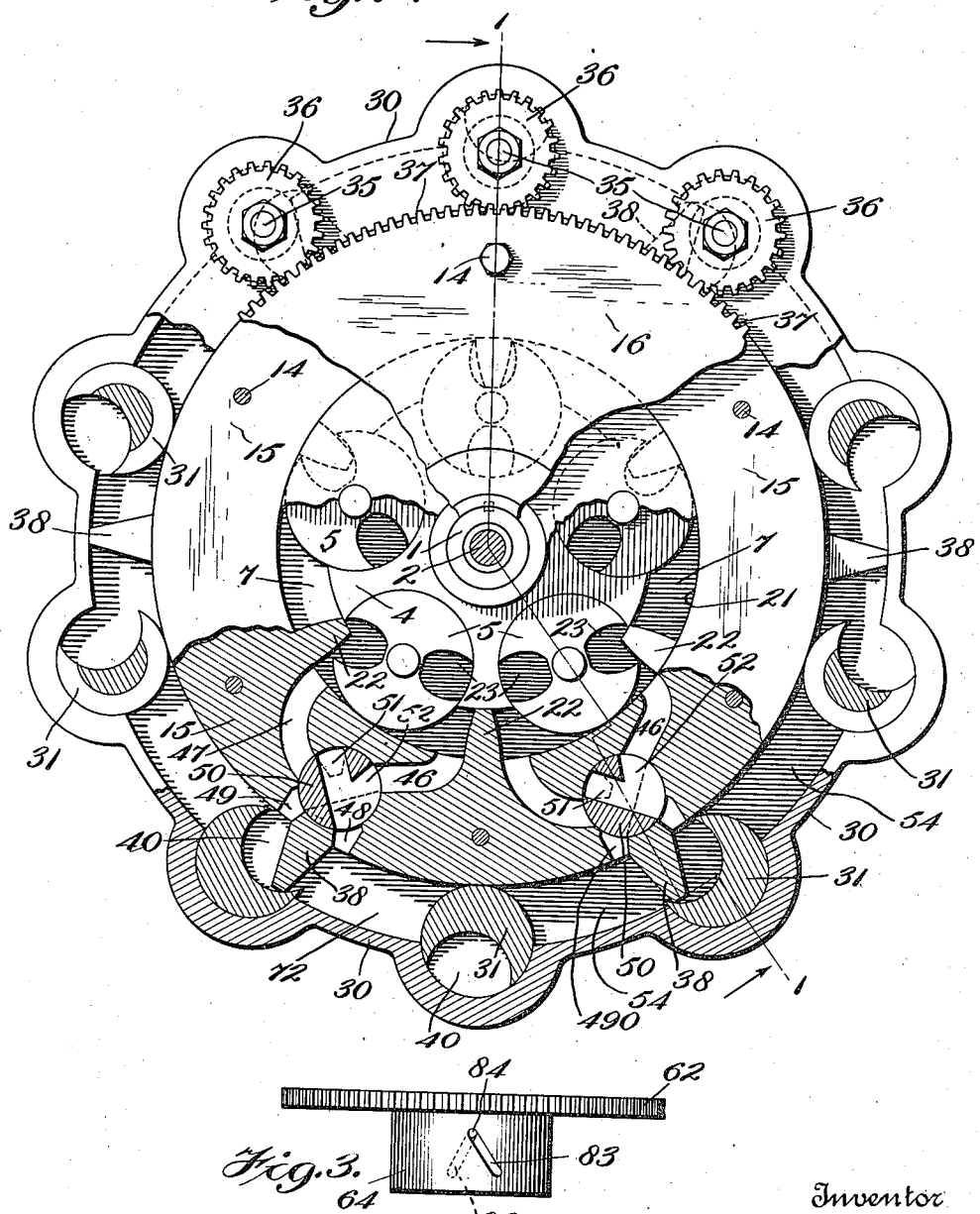

M. A. KETTLER.
FLUID SPEED CHANGING GEAR.
APPLICATION FILED DEC. 15, 1914.

1,199,904.

Patented Oct. 3, 1916.
3 SHEETS—SHEET 3.

Witnesses
Byron B. Collins
F. Wm. Ernst

Inventor
Milton A. Kettler; by
Attorney

UNITED STATES PATENT OFFICE.

MILTON A. KETTLER, OF WASHINGTON, DISTRICT OF COLUMBIA.

FLUID SPEED-CHANGING GEAR.

1,199,904. Specification of Letters Patent. Patented Oct. 3, 1916.

Application filed December 15, 1914. Serial No. 877,370.

*To all whom it may concern:*

Be it known that I, MILTON A. KETTLER, a citizen of the United States, residing at Washington, District of Columbia, have invented certain new and useful Improvements in Fluid Speed-Changing Gear; and I do hereby declare the following to be a full, clear, and exact description of the invention, such as will enable others skilled in the art to which it appertains to make and use the same.

This invention relates to speed changing reducing gears of the fluid clutch type, and has for its object to provide a mechanism which will be simple in construction, efficient in action, comparatively inexpensive to construct, and more certain in operation than those heretofore proposed.

With these and other objects in view the invention consists in the novel details of construction and combinations of parts more fully hereinafter disclosed and particularly pointed out in the claims.

Figure 1:
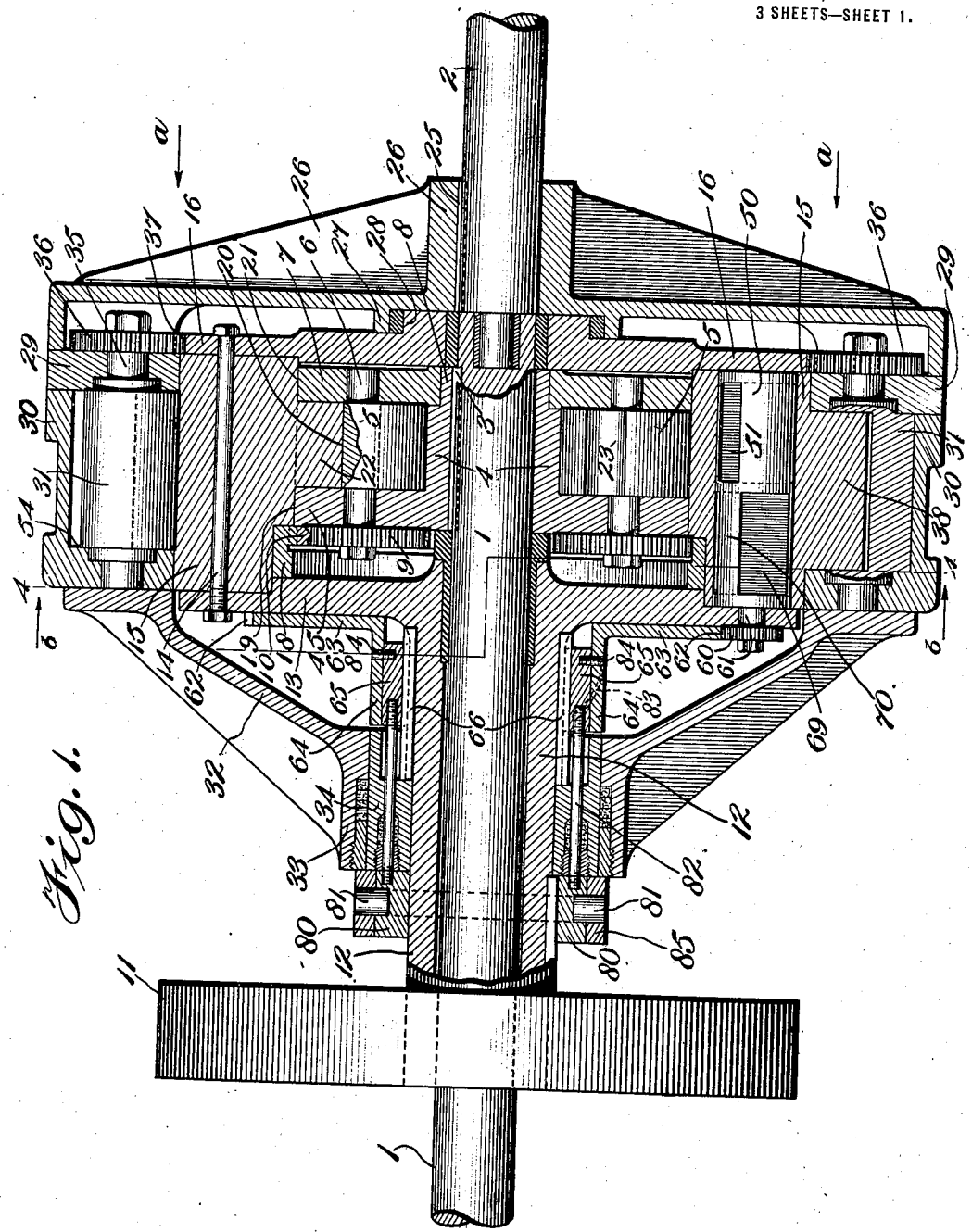
Figure 4:
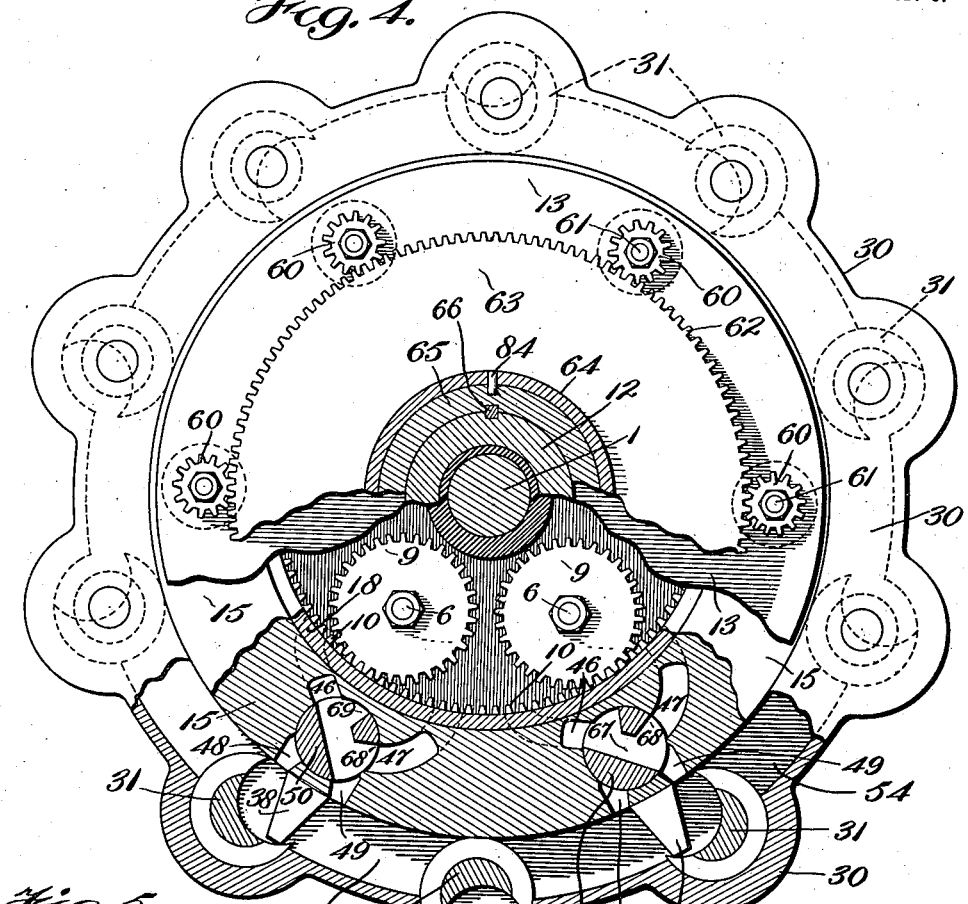
Figure 5:
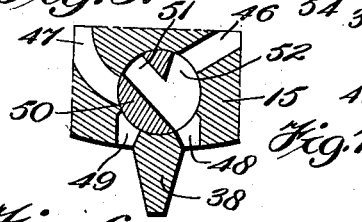
Figure 7:
Figure 9:
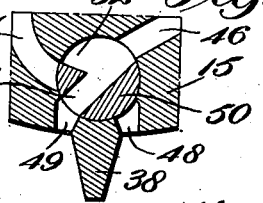
Figure 6:
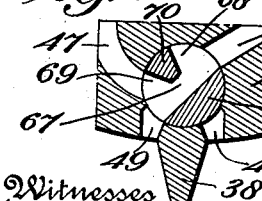
Figure 8:
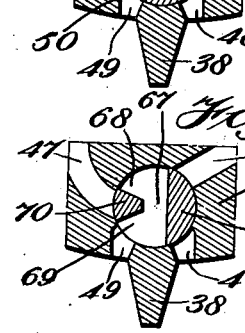
Figure 10:

Referring to the accompanying drawings forming a part of this specification, in which like numerals designate like parts in all the views: Figure 1 is a diagrammatic longitudinal sectional view partly in elevation taken on the line 1—1 of Fig. 2, of a mechanism made in accordance with my invention; Fig. 2 is an end elevational view partly in section of the parts shown in Fig. 1, looking in the direction of the arrows *a* and with the casing removed; Fig. 3 is a detail plan view of one of the gears for controlling the valves; Fig. 4 is a view taken on the line 4—4 of Fig. 1, looking in the direction of the arrows *b;* Fig. 5 is a diagrammatic sectional view showing the position of one of the controlling valves for a forward drive; Fig. 6 is a view similar to Fig. 5 showing the return passages for the oil when the parts are in the same position as in Fig. 5; Fig. 7 is a view similar to Fig. 5 showing the position of the valve when the clutch is stopped or its driving member is stationary; Fig. 8 is a view of the valve showing the return passages for the oil when the parts are in the same position as in Fig. 7; Fig. 9 is a view similar to Fig. 5, showing the position of the valve when the clutch is reversed, and Fig. 10 is a view of the return passages for the oil when the parts are in the position shown in Fig. 9.

1 indicates any suitable driving shaft, and 2 any suitable driven shaft. Keyed to the driving shaft 1, as at 3 is the driving disk member 4 provided with the rotating driving abutments 5, mounted on the short shafts 6 journaled at one end in said driving disk 4 and at their other end in the ring member 7 fitting the collar like projection 8 with which said disk member 4 is provided. Mounted on one end of each short shaft 6 is a pinion 9 meshing with the internal gear 10 best shown in Fig. 4, and more fully described below. Also mounted on the driving shaft 1 is a brake wheel 11 rigid with the sleeve 12 carrying the plate like member 13 to which is secured as by the bolts 14 the speed changing ring member 15, and 16 represents a second plate like member also mounted on the driving shaft 1 overlying said ring member 15, and through which the bolts 14 also pass. The ring member 15 is provided with an annular recess into which is fitted a gear ring 18 provided with the internal gear 10 above mentioned. The lines 19, 20 and 21 in Fig. 1 indicate respectively the dividing surfaces between the disk 4, the abutments 5, and the annular ring member, and the speed changing ring 15 which is rigid with the brake wheel 11. It will now be clear from Figs. 1 and 4, if the said brake wheel 11 and gear ring 18 are held stationary each of the pinions 9 will ride around said internal gear 10 as a track and cause each of the shafts 6 and abutments 5 to rotate.

The speed changing ring 15 is provided with inwardly projecting abutments 22 for coaction with each rotary driving abutment 5, and each driving abutment 5 is provided with diametrically opposite recesses 23 adapted to receive said projecting abutments 22 when the two sets of abutments pass each other. The pinions 9 are further engaged with the gear 10 at such points as will compel each rotary abutment 5 to be so turned when it meets an abutment 22 projecting across its path, that said abutment 22 will enter a recess 23 and each rotary abutment 5 in question will accordingly pass each abutment 22 in the manner well known.

Secured to the driven shaft 2 as by the spline 25 is a cover plate 26 having a projecting ring 27 overlying a projection 28 on the plate 16, and secured to the outer laterally projecting edge of said cover plate 26 is a ring member 29. Associated with and abutting said ring member 29 is a driven ring member 30, carrying a plurality of driven rotary abutments 31, and associated with and abutting said driven ring member 30 is a second cover plate 32 having a hub 33, fitting the collar or sleeve 34 surrounding the sleeve 12. Each of the driven abutments 31 is provided with a short shaft 35 journaled in the rings 29 and 30 as shown, and each shaft carries on one of its ends a pinion 36 engaging the external gear 37 carried by the driving plate member 16 as will be clear from Figs. 1 and 2. The speed changing ring 15 is also provided with a plurality of externally projecting abutments 38 lying in the path of the driven rotary abutments 31, and the said driven abutments 31 are provided with recesses 40 adapted to receive and permit to pass said projecting abutments 38 as the said driven abutments 31 are rotated through their shafts 35, pinions 36 and the gear 37 in the manner well understood by those skilled in this art.

It will now be clear from what has been so far disclosed that power being applied to the driving shaft 1, the driving disk 4 will rotate carrying with it the driving abutments 5 and pinions 9. And if the brake wheel 11 and internal gear 10 be held stationary, the rotation of said abutments 5 will be so timed as to pass the internal abutments 22 carried by the speed changing ring 15. It will further be clear that should the driven shaft be rotated by any means, the gear 37 rigid with the speed changing ring 15, and the pinions 36 will cause the driven rotary abutments 31 to turn on their axes at such times as will enable them to pass the outwardly projecting abutments 38 also carried by the speed changing ring 15. It will likewise be clear that since the gears and pinions always remain intermeshed, the above passages of the various abutments will likewise take place even though the ring 15 and its gears 10 and 37 be rotated in either direction while the shafts 1 and 2 are being rotated, so that it follows that none of the abutments can, at any time interfere with each other, all as will be readily understood.

The action of the oil or other fluid in transmitting power from the driving to the driven shaft will now be disclosed.

As shown in Fig. 1, the disk 4 is cut away near the shaft 1 and spline 3, and has an extending side portion 45 thus forming an L shaped recess which is closed on one side by the ring 7 and in which are located the abutments 5. But between these abutments 5, there exists a considerable cubic space as is indicated by the shaded portions of the ring 7 in Fig. 2, and in this space some of the operating fluid is located.

Between each pair of inwardly extending abutments 22 on the ring 15 is a driving passage 46 for the oil and a return 47.

48 represents an exit for the driving oil and 49 an inlet for the oil returned to the disk 4.

Controlling each set of passages 46 and 47 and the associated exit 48, and inlet 49, is a three way valve 50, each provided with the straight passage 51, and the cross passage 52 entering said passage 51.

It will further be seen that the outer driven ring member 30 is provided with an L shaped cut away space closed on one side by the ring 29, and in which is located the driven abutments 31. Between these abutments 31 there is a considerable portion of this said L shaped space available for oil as is indicated in Fig. 2, by the shaded portions 54 of the ring 30. In fact not only does the oil fill the two cubic spaces mentioned above, but it fills the passages and cutaway places in the abutments as well.

Each valve 50 is provided with a pinion 60 on its stem 61, which pinion meshes with a gear 62, carried by the plate 63, having the sleeve 64, surrounding the ring 65, slidingly keyed to the sleeve 12 as by the gibs or splines 66. It results from the construction just described that so long as the brake wheel 11 and the plate 13 are stationary the pinions 60 and valves 50 will also be stationary, but if the brake wheel turns, said gear, pinions and valves will also turn around shaft 1, all as will appear more fully hereinafter.

Each valve plug 50 in addition to having the passages 51 and 52, in its one half, is provided in its other half, with a somewhat similar set of passages 67, 68 and 69, leaving the solid portion 70 between the passages 68 and 69, all as will be clear from Figs. 1, 4, 6, 8 and 10.

The operation of my invention is as follows:—Power being applied to rotate the shaft 1, the driving disk 4 splined to said shaft will be rotated, thus moving each of the driving abutments 5 in say a counter clockwise direction as seen in Fig. 2. Supposing the brake wheel 11 and speed changing ring 15 to be held stationary, each driving rotating abutment 5 will force oil in front of it and through that passage 46 in said ring 15 that lies in front of it. From the passage 46, the valves 50 being set as indicated, the driven oil passes through the valve passage 52 and out the exit 48 into the space provided in the ring 30, where it meets the oil already in said space. This causes a pressure against the driven abutment 31 that lies immediately ahead of the driven oil, and forces said abutment in a counter clockwise direction as seen in Fig. 2, thus turning the driven ring 30, the ring 29, the outer plates 32 and 26, and the driven shaft 2. As the driving abutments reach the inwardly projecting abutments 22 carried by the ring 15, the said abutments enter the recesses 23 in the abutments 5, and an oil tight joint is maintained during the passage of these said abutments in the manner above disclosed. If there is no leakage, the driven abutments 31, will be forced forward a linear distance equal to the linear travel of the driving abutments 5, but as the latter are at a shorter distance from the axes of the shafts the angular velocity of the outer abutments, and plate 26 and shaft 2 will not be as great as the angular velocity of the corresponding driving parts. Therefore, the driven shaft will turn at a reduced speed. The oil will in the manner disclosed continue to be forced from in front of the driving abutments 5 to the rear of the driven abutments 31, but as the latter are driven past the speed changing ring abutments 38, said abutments 38 will occupy new spaces between the abutments 31, and bring the inlet ports 49 into register with said new spaces. These inlet ports are in register with the return passages 67 and 69 in the valves 50, and said return passages are in register with the return passage 47 in the ring 15, so that oil will flow back behind each driving abutment 5, as fast as it is driven from in front of it. The positions of the parts during this driving action will be clear from Figs. 1, 2, 5 and 6. The same oil that is forced from in front of a given abutment 5, however, is not immediately forced to the rear of the same abutment 5; for a little consideration will show that oil can never pass either of the ring abutments 22 or 38; but oil forced into a given compartment 72 for example in Fig. 2, will escape through the inlet marked 490 in said figure, and occupy a space behind the next abutment 5 ahead of the first abutment 5. It will then be driven by a succeeding abutment 5 through the next valve and exit ahead, and so on until it makes a complete circuit, being alternately compressed and exhausted so to speak into and from spaces such as 72.

As above stated, should the brake wheel 11 be held stationary during the operation described, a reduced speed of a definite proportion to the original speed will be imparted to the driven shaft 2, but at a greater leverage. If now the brake wheel 11 is allowed to slip so that it travels as fast as the disk 4 and abutments 5, then no speed will be imparted to the shaft. On the other hand, if the brake wheel 11 is allowed to slip at various speeds between zero and that of the driving shaft, then an endless variety of speeds may be imparted to the driven shaft 2, and each of which will be a definite ratio to the speed of said driving shaft 1. The above supposes the valves 50 to be wide open, but suppose these valves be partially closed. It is evident that another endless variety of changed speeds may be had each bearing definite but different ratios from those above, to that of the driving shaft. Provision is made for adjusting the valves as follows:—The gear 62 is splined to the sleeve 12 as above stated and therefore turns with the brake wheel 11 so that no adjusting movement of the valves is had through the turning of the brake wheel 11. An adjustable collar 80 provided with the usual groove for the reception of pins 81, is provided on the sleeve 12, and this collar 80 is connected by the rods 82 to the slidable ring 65, connected to the collar or sleeve 64 as above stated. The said sleeve 64 is provided with spiral grooves 83, Figs. 1 and 3, adapted to receive pins 84 carried by the ring 65, and it therefore results that upon sliding the said pins longitudinally of the shaft 1, the sleeve 64, gear 62 and valves 50 will be rotated. A ring 85 carrying the pins 81 serves to slide the parts. Accordingly the valves 50 may be adjusted to any desired position while the machine is running, and thus an endless variety of change speeds each of a definite ratio to the original speed may be had. In addition to the above infinite number of change speeds that may be had, my invention permits the driven shaft to stop still, while the engine or driving shaft continues to run full speed. To accomplish this it is only necessary to turn the valves 50 through the mechanism disclosed to the position shown in Fig. 7 whereupon the inlet passage 47 will be connected with the driving passage 46 through one part of the valve plug while the other portion of said plug will have its passage disposed as shown in Fig. 8. With this adjustment of the valves 50 no power will be transmitted to the shaft 2, even though the brake wheel 11 is held fast. Again, the engine may continue to run as before, and the driving passages 51 and 52 of the valves brought into the position shown in Fig. 9, which will cause the shaft 2 to be driven in an opposite direction or reversed. The other or exhaust passages of the valves 50 when in their reversed positions are shown in Fig. 10.

Although this liquid clutch or speed changing gear is especially adapted for automobiles, yet, its use is by no means confined thereto, as it may be made in different sizes and adapted for machinery in general. It is especially adapted for lathes, naval engines and a host of other machines.

It is obvious that those skilled in the art may vary the details of the invention without departing from the spirit thereof, and therefore I do not wish to be limited to the above disclosure except as may be required by the claims.

What I claim is:—

1. In a speed changing means, the combination of a driving shaft; a driven shaft; a brake controlled means provided with passages; means for forcing fluid through said passages from said driving shaft; and means inclosing said brake controlled means connected to said driven shaft adapted to be moved by said fluid, substantially as described.

2. In a speed changing means, the combination of a driving shaft; a driven shaft; a rotary brake controlled means provided with passages; rotating means for forcing fluid through said passages from said driving shaft; and rotating means connected to said driven shaft inclosing said brake controlled means adapted to be moved by said fluid, substantially as described.

3. In a speed changing means the combination of a driving shaft; a plurality of driving abutments connected to said shaft; a brake controlled means provided with abutments coacting with said first named abutments and having passages through which said abutments cause fluid under pressure to pass; a driven shaft; a plurality of abutments connected to said driven shaft adapted to be moved by said fluid, and a casing carrying said last named abutments surrounding said brake controlled means, substantially as described.

4. In a speed changing gear the combination of driving and driven shafts; rotary abutments associated with said shafts for transmitting power from one to the other, a casing carrying certain of said abutments; and a revolving brake controlled means inside, and independent of said abutments adapted to change the speed of the driven shaft.

5. In a speed changing gear the combination of driving and driven shafts; rotary abutments concentrically arranged associated with said shafts for transmitting power from one to the other; and a brake controlled means provided with fluid passages, located between said concentric abutments and provided with a plurality of abutments coacting with said first named abutments.

6. In a speed changing gear the combination of driving and driven shafts; a plurality of rotary abutments carried by each of said shafts; means for rotating each of said abutments; a rotating brake controlled speed changing means provided with fluid passages and with abutments coacting with said first named abutments; and valves controlling said passages.

7. In a speed changing gear the combination of driving and driven shafts; a plurality of rotary abutments carried by each of said shafts; means for rotating each of said abutments; a rotary brake controlled speed changing means provided with fluid passages and with abutments coacting with said first named abutments; valves controlling said passages; and means for regulating said valve while said abutments are moving.

8. In a speed changing gear the combination of driving and driven shafts; means for transmitting power from one shaft to the other; and a speed changing brake controlled means located inside said first named means adapted to turn independently of each shaft and provided with fluid passages associated with said power transmitting means.

In testimony whereof I affix my signature, in presence of two witnesses.

MILTON A. KETTLER.

Witnesses:
WM. P. HARTLEY,
J. A. WHELAN.